Patented Sept. 16, 1947

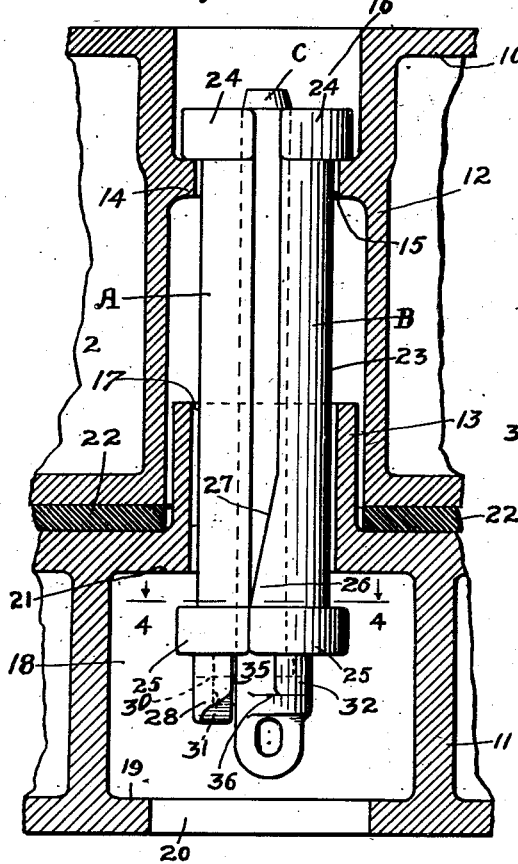
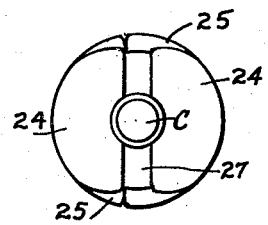
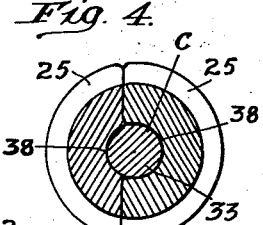
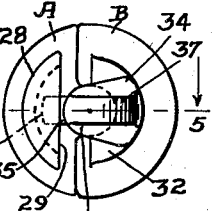
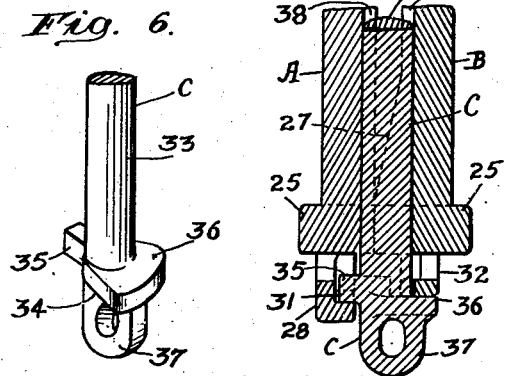
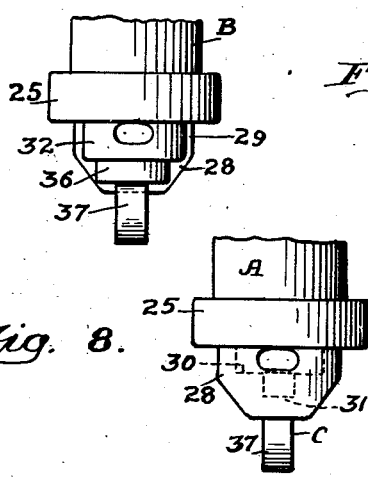
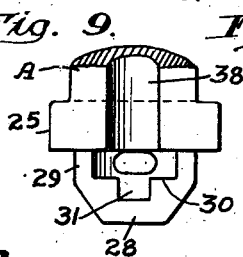
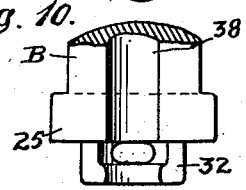

2,427,404

UNITED STATES PATENT OFFICE 2,427,404

LOCKING CENTER PIN FOR RAILWAY CARS

Stacy B. Haseltine, La Grange, Ill., assignor to W. H. Miner, Inc., Chicago, Ill., a corporation of Delaware Application March 1, 1945, Serial No. 580,393

6 Claims. (Cl. 105—200)

This invention relates to improvements in locking center pins for railway cars.

One object of the invention is to provide an improved car construction comprising a locking center pin for connecting the body and truck bolsters of a car and holding the bolsters against vertical separation while in service.

A further object of the invention is to provide a locking center pin of the character set forth in the preceding paragraph composed of sections which may be expanded to interlock with the bolsters and is designed to be locked in position by a central filler element which acts as the spreading means, wherein means is provided for preventing the filler element from becoming accidentally detached from the other parts of the pin.

A more specific object of the invention is to provide a bolster locking center pin comprising a pair of outer sections or members and a central filler element for holding the outer sections expanded, wherein the filler element is rotatable to bring the same into shouldered locking engagement with means on the lower end of one of the outer sections of the pin to hold said element against removal in downward direction with respect to said outer sections, and wherein the weight of the other outer section is utilized to maintain said shouldered locking engagement by preventing rotation of the filler element with respect to said outer sections.

Other objects of the invention will more clearly appear from the description and claims hereinafter following.

In the drawing forming a part of this specification, Figure 1 is a vertical sectional view taken lengthwise of the car through the mid portions of the body and truck bolsters of the underframe structure, illustrating my improvements in connection therewith, the center pin being shown in elevation. Figure 2 is a top plan view of the center pin shown in Figure 1. Figure 3 is a bottom plan view of the center pin looking upwardly in Figure 1. Figure 4 is a horizontal, transverse sectional view, corresponding to the line 4—4 of Figure 1. Figure 5 is a central vertical sectional view of the lower end portion of the locking pin, said view corresponding substantially to the line 5—5 of Figure 3. Figure 6 is a perspective view of the lower end portion of the filler element of my improved locking center pin. Figure 7 is a side elevational view of the bottom end portion of the improved pin looking from right to left in Figure 1. Figure 8 is a view, similar to Figure 7, looking from left to right in Figure 1. Figure 9 is an elevational view of the bottom end portion of the left hand outer member of the pin, as seen in Figure 1, and looking from right to left in said figure. Figure 10 is an elevational view of the bottom end portion of the right hand outer member of the pin, as seen in Figure 1, and looking from left to right in said figure.

In said drawing, 10 indicates the body bolster of the car and 11, the truck bolster. These bolsters are of usual well-known design, the body bolster being provided with a center section 12 to accommodate the center pin, and the truck bolster being provided with an upstanding hollow boss or flange 13, projecting into the section 12 of the body bolster. The section 12 is of substantially tubular form having an inwardly projecting flange or rib 14 between the top and bottom ends thereof. The flange 14 defines an opening 15 adapted to accommodate the center pin. Above the flange 14, the section 12 forms a pocket 16 adapted to accommodate the head at the upper end of the pin. The annular hollow boss or upstanding flange 13 of the truck bolster 11 extends into the bottom portion of the opening of the section 12 of the body bolster, as most clearly shown in Figure 1. The hollow boss provides a circular opening 17 to accommodate the center pin. The opening 17 of the truck bolster and the opening 15 of the body bolster are in axial alignment. Below the opening 17, the truck bolster is provided with a pocket 18 having a bottom wall 19. The bottom wall 19 has an opening 20 therethrough axially aligned with the openings 15 and 17, but of greater diameter than these openings. The pocket 18 serves the purpose of accommodating the head at the bottom end of the center pin. As shown in Figure 1, the pocket 18 is of greater size than the opening 17 of the boss 13, thereby providing a downwardly facing shoulder 21 adjacent said opening, which cooperates with a head at the bottom end of the center pin to restrict upward movement of the latter. The usual bearing plate or shim 22 is interposed between the body and truck bolsters around the upwardly projecting boss 13 of the truck bolster.

My improved locking center pin comprises broadly a pair of outer members or sections A and B and a central spreader or filler element C.

The two outer members or sections A and B are of similar design, except as hereinafter pointed out. Each outer member comprises a substantially semi-cylindrical shank 23 having heads 24 and 25 at the top and bottom ends thereof. The top head 24 is in the form of an eccentric, substantially semi-cylindrical, outstanding flange, and the bottom head 25 is in the form of a concentric, substantially semi-cylindrical flange.

The members A and B are laterally spaced apart at the upper ends and have contact with each other on their inner sides at their lower ends. The member B is laterally inwardly enlarged at its lower end, as indicated at 26, to provide this contact. The zone of contact is on substantially flat, vertical faces, preferably of a vertical height at least as great as the thickness of the flange or head 25 of either of these members. Immediately above the zone of contact, the enlarged portion 26 of the member B inclines away from the member A in upward direction, as indicated at 27. The spaced arrangement of the upper end portions of the members A and B permits collapse of said upper end portions of the pin to make possible insertion and removal of said members.

The heads 24—24 at the upper end of the members A and B are made of such a size and contour that they will pass freely through the pin receiving openings 15 and 17 of the body and truck bolsters when these members are inserted or removed in succession from underneath the truck bolster, with the filler member absent so that the upper portion of the center pin may be collapsed. The member A, which is the left hand member, as seen in Figure 1, has a depending lug 28 at the lower end thereof. The lug 28 comprises a transversely curved wall 29 and a laterally inwardly directed, horizontal shelf or ledge 30 at the lower end of said wall. The ledge or shelf 30 is provided with an upwardly opening slot 31, which is radial to the vertical central axis of the pin and forms a locking seat at the upper side of said shelf.

The member B, which is the right hand outer member, as viewed in Figure 1, is provided with a depending lug 32 at the lower end thereof, which is diametrically opposed to the lug 28 of the member A. The lug 32 is in the form of an arcuate flange slightly thickened at its lower end, as shown most clearly in Figure 10. As will be seen upon reference to Figures 1 and 5, the lugs 28 and 32 are located at diametrically opposite sides of the vertical central axis of the pin and are spaced apart a considerable distance and are reversely arranged, that is, with the concave sides of the wall 29 and the flange 32 facing each other.

The filler element C comprises a cylindrical shank 33 and a head 34 at the lower end of the shank. A radially projecting finger or lug 35 extends from one side of the head 34 and a fan-shaped flange or shelf 36 extends laterally outwardly from the diametrically opposite side of said head. The finger or lug 35 is of such a length that it overlaps the shelf 30 of the lug 28 when the element C is in the position shown in Figures 1, 3, and 5, and is of such a thickness that it seats freely in the slot or seat 31 of said shelf. At the lower side thereof, the head 34 is provided with a depending eye portion 37, which projects beyond the lower limits of the outer members A and B, thus making it readily accessible for manipulation of the element C.

The top end of the shank of the element C is preferably beveled off, as shown, to facilitate insertion of said element between the outer members A and B.

The inner sides of the members A and B are centrally vertically slotted or grooved, as indicated at 38. These slots or grooves are of concave cross section and, when the members A and B of the pin are in assembled position, form a central bore in which the shank 33 of the element C fits loosely and is rotatable.

As will be seen upon reference to Figure 1, when the pin comprising the outer members A and B and the filler element C interposed between said members is applied to the bolsters, the shank of the pin substantially fits the openings 15 and 17 of the body and truck bolsters with the heads 24—24 and 25—25 disposed respectively above the shoulder presented by the flange or rib 14 of the body bolster, and below the shoulder 21 of the truck bolster. The pin is thus held against removal in both downward and upward directions.

In applying the center pin to the bolsters, the member A is first inserted through the openings of the bolsters from underneath the truck bolster and displaced laterally outwardly to engage the heads 24 and 25 thereof with the shoulders of the bolsters. After this has been done, the member B is inserted from underneath the truck bolster, through the bolster openings alongside the member A. As will be evident, the inclined portion 27 of the member B provides the required clearance to permit inclining of this member to the proper extent to permit the head at the upper end to pass through the bolster opening. When the member B has been fully inserted, it will have been displaced laterally outwardly at its upper end by spreading apart of the lower end of the pin, to bring the head 24 thereof into shouldered engagement with the bolster 10, and, due to the fact that the members A and B have their inner side faces adjacent the lower end of the pin contacting, the head 25 at the lower end of the member B will be forced to engage beneath the shoulder of the truck bolster. The filler element C is next inserted between the members A and B from underneath the truck bolster to hold the members of the pin separated and in shouldered engagement with the body bolster. Before application of the element C, it is turned so that the lug or finger 35 thereof is in alignment with, and extends lengthwise of, the opening between the lugs 28 and 32 at the lower ends of the members A and B. In this position, the flange 36 underlies the lug 32 of the member B. Inasmuch as the finger 35, when in this position, is free to pass between the lugs 28 and 32, the filler element may be shoved upwardly until the finger 35 is brought to a position above the level of the shelf or ledge 30 of the lug 28. While the filler element is thus being forced upwardly, the member B is lifted slightly by engagement of the underlying flange 36 of the filler element with the underneath side of the lug 32 of said member B. With the finger 35 thus positioned above the level of the shelf 30 and the flange 36 supporting the member B, the element C is given a quarter turn, thereby bringing the finger or lug 35 into registration with the slot or seat 31 of the lug 28, and the flange 36 in full supporting relation with respect to the member B. The element C is then permitted to drop downwardly to seat the finger 35 in the slot or seat 31, the pressure exerted by the weight of the member B supported on the flange 36 of the element C, forcing the latter to drop and also holding the same against upward movement after the element C has been locked against rotation by engagement of the finger 35 in the seat 31.

The element C is thus securely held against rotation with respect to the members A and B, thereby preventing the finger 35 from reaching a position of alignment with the openings between the lugs 28 and 32 and possible accidental dropping out of the element C from between the members A and B.

In this connection it is pointed out that the outer members A and B of the pin are held against relative rotation or shifting with respect to each other about the vertical axis of the pin by the contact provided on their inner sides at the lower end thereof, thus at all times maintaining the lugs thereof in transverse alignment, thereby assuring proper accommodation of the finger 35 in the slot of the lug 28 of the member A.

In removing the center pin, the reverse procedure is followed. The element C is first pushed upwardly to lift the finger 35 thereof clear of the slot 31, and is then given a quarter turn to align the finger with the opening between the lugs of the members A and B. The element C is then withdrawn from between the members A and B by pulling the same downwardly, a hook or similar tool being used for this purpose, the eye 37 serving as a convenient means for anchoring the hook. After withdrawal of the filler element, the outer members are removed in succession, the member B being the first withdrawn.

I claim:

1. In car construction, the combination with body and truck bolsters having aligned center pin receiving openings; of a center pin insertable from beneath said truck bolster, said pin comprising outer members headed at opposite ends, and a central filler element between said outer members, said filler element holding the pin expanded with the heads thereof in shouldered engagement with the bolsters, a retaining ledge on the lower end of one of said outer members, a radially projecting locking finger on said element at one side thereof, and a supporting flange projecting from the opposite side of said element, on which the lower end of another of said outer members rests, said element being rotatable to bring said locking finger into position to overhang and rest on said ledge to support said element against withdrawal in downward direction from between said outer members.

2. In a locking pin for connecting the body and truck bolsters of a railway car, having aligned pin receiving openings, the combination with a pair of outer members headed at opposite ends; of a central filler element insertable from beneath the body bolster between said outer members, said filler element holding said outer members of the pin spread apart with the heads thereof in shouldered engagement with the bolsters; a retaining ledge on one of said members on which said element shoulders to support the latter against withdrawal in downward direction; and a retaining ledge on said element on the upper side of which the other member bears to hold said element seated on said first named retaining ledge, said filler element and said retaining ledge of the outer member being relatively displaceable to bring said element and ledge into shouldered engagement.

3. In a locking pin for connecting the body and truck bolsters of a railway car, having aligned pin receiving openings, the combination with a pair of outer members headed at opposite ends; of a central filler element between said outer members, said filler element holding said outer members of the pin spread apart with the heads thereof in shouldered engagement with the bolsters; a retaining ledge on one of said members on which said element shoulders to support the latter against withdrawal in downward direction; and a retaining ledge on said element on the upper side of which the other member bears to hold said element seated on said first named retaining ledge, said element being rotatable within said outer members to bring said element into shouldered engagement with the retaining ledge of said outer member.

4. In a locking pin of the character described, the combination with elongated outer members having retaining flanges at the top and bottom ends; of a filler element between said outer members, said filler element being rotatable with respect to said members; a supporting ledge at the bottom end of one of said outer members, said ledge having an upwardly opening locking seat; an elongated locking lug at the lower end of said element adapted to rest in said seat to support said element against downward displacement and hold the same against rotation; and a ledge on said element on which another of said members bears to hold said locking lug engaged within said seat.

5. In a locking pin of the character described, the combination with a pair of elongated outer members having retaining flanges at the top and bottom ends; of an elongated, cylindrical filler element between said outer members, said outer members being cut out to accommodate said cylindrical element; a lug supporting socket on one of said outer members at the bottom end thereof; a downward projection on the other outer member; a laterally projecting supporting shelf on said element at the lower end thereof on which the projection of said member bears; and a locking finger on the lower end of said element adapted to pass between said socket and projection, said finger being engageable within said socket to lock said element against rotation and hold the same against downward displacement with respect to said outer members.

6. In a locking pin of the character described, the combination with an elongated, central filler element of cylindrical cross section having a locking lug projecting from one side thereof at its lower end and a diametrically opposite shelf projecting from the other side thereof at said lower end; of a pair of elongated outer members embracing said filler element at opposite sides, said outer members being headed at the top and bottom ends; a supporting ledge on the lower end of one of said outer members having a seat within which said lug of said element is supported and held against rotary displacement about the vertical central axis of the pin; and a downward extension at the lower end of the other outer member bearing on said shelf of said element to support said last named member by said element, said ledge and downward extension being at diametrically opposite sides of the pin and laterally spaced apart, said lug being engaged within said seat when said filler element is in one position said lug being of a width to pass freely between said ledge and downward extension when said element is rotated through an arc of 90 degrees from said position.

STACY B. HASELTINE.

REFERENCES CITED

The following references are of record in the file of this patent:

UNITED STATES PATENTS

| Number | Name | Date |
|---|---|---|
| 1,684,537 | Geiger | Sept. 18, 1928 |
| 1,739,229 | Haseltine | Dec. 10, 1929 |
| 2,252,889 | Haseltine | Aug. 19, 1941 |